United States Patent
Pan

(12) 
(10) Patent No.: US 6,212,305 B1
(45) Date of Patent: Apr. 3, 2001

(54) HIGHLY MINIATURIZED, FOLDED REFLECTION OPTICAL ISOLATOR

(75) Inventor: Jing-Jong Pan, Milpitas, CA (US)

(73) Assignee: E-Tek Dynamics, Inc., San Jose, CA (US)

( * ) Notice: Subject to any disclaimer, the term of this patent is extended or adjusted under 35 U.S.C. 154(b) by 0 days.

(21) Appl. No.: 09/340,864

(22) Filed: Jun. 28, 1999

(51) Int. Cl.[7] ........................................ G02B 6/00
(52) U.S. Cl. ................................. 385/11; 385/12
(58) Field of Search ......................... 385/11, 12

(56) References Cited

U.S. PATENT DOCUMENTS

| | | | |
|---|---|---|---|
| 5,033,830 | 7/1991 | Jameson | 350/403 |
| 5,208,876 | 5/1993 | Pan | 385/11 |
| 5,768,005 | 6/1998 | Cheng et al. | 359/281 |
| 5,796,889 | 8/1998 | Xu et al. | 385/24 |

Primary Examiner—Robert Kim
(74) Attorney, Agent, or Firm—Townsend and Townsend and Crew LLP

(57) ABSTRACT

An optical isolator has a sleeve with a longitudinal channel, a pair of optical fibers in the longitudinal channel, a first, second and third birefringent crystals, a GRIN lens, a Faraday rotator and a mirror element. The first birefringent crystal covers the end facet of one of the pair of optical fibers, and the second and third birefringent crystals cover the end facet of the other of the pair of optical fibers. The GRIN lens has first and second end faces with the first end face proximate the first, second and third birefringent crystals. The Faraday rotator is located between the mirror element and the second end face of the GRIN lens. Light in one direction from a first optical fiber of the pair passes through, and back from, the first, second and third birefringent crystals, the GRIN lens, the Faraday rotator and the mirror element into a second optical fiber of the pair. On the other hand, light in a reverse direction from the second optical fiber passes through, and back from, the first, second and third birefringent crystals, the GRIN lens, the Faraday rotator and the mirror element, but not into the first optical fiber so that an optical isolation function is achieved. Multiple optical isolators may be obtained with multiple pairs of optical fibers fixed in the channel of the ferrule.

14 Claims, 5 Drawing Sheets

Birefringent Crystal I Orientation
(Optical axis plane is in vertical and α=45°)

Birefringent Crystal II Orientation
(Optical axis plane is 45° to the horizontal and α=45°)

Birefringent Crystal III Orientation
(Optical axis plane is 45° to the horizontal and α=45°)

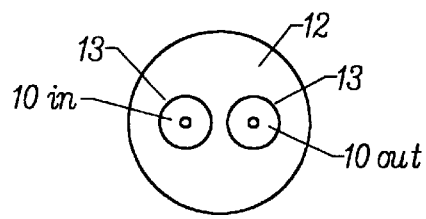 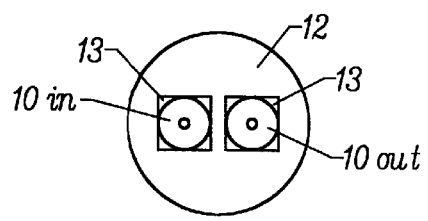
FIG. 6C     FIG. 6D
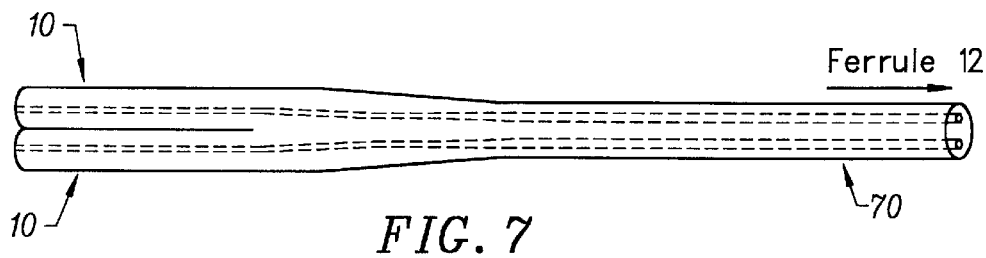
FIG. 7
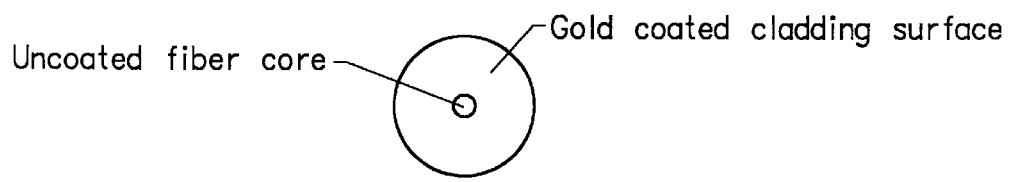
FIG. 8
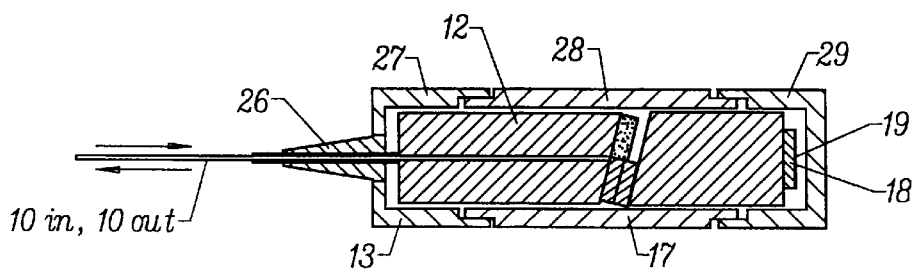
FIG. 9

HIGHLY MINIATURIZED, FOLDED REFLECTION OPTICAL ISOLATOR

BACKGROUND OF THE INVENTION

The present invention relates to fiberoptic devices and, more particularly, to optical isolators useful in allowing the transmission of light signals in one direction along an optical fiber and blocking the transmission of light signals in the opposite direction.

In present day optical fiber technology, it is often very useful for light signals to move only in one direction along an optical fiber. For example, semiconductor lasers are typically used to generate and to relay light signals on optical fibers. These lasers are particularly susceptible to light signal reflections, which can cause a laser to become unstable and noisy. Optical isolators are used to block these reflected signals from reaching the laser. Ideally, an optical isolator transmits all of the light signals in the forward direction and blocks all of the signals in the reverse direction.

Of course, optical isolators do not attain ideal performance levels and improvements are constantly sought. Furthermore, lowered manufacturing costs are desirable to encourage the spread of optical fiber networks with their inherently large bandwidths. With an optical isolator generally required for each laser generating signals on an optical fiber, it is beneficial that the cost of the optical isolators be lowered as much as possible. Finally, for ease of installation, reliability and low material costs, a small size for optical isolators are desirable also.

The present invention substantially meets those goals by offering a miniaturized optical isolator having a high performance. The optical isolator is capable of being manufactured at lowered costs.

SUMMARY OF THE INVENTION

The present invention provides for an optical isolator having a sleeve with a longitudinal channel, a pair of optical fibers in the longitudinal channel, a first, second and third birefringent crystals, a GRIN lens, a Faraday rotator and a mirror element. Each of the optical fibers in the longitudinal channel has an end facet. The first birefringent crystal covers the end facet of one of the pair of optical fibers, and the second and third birefringent crystals cover the end facet of the other of the pair of optical fibers. The GRIN lens has first and second end faces with the first end face proximate the first, second and third birefringent crystals. The Faraday rotator is located between the mirror element and the second end face of the GRIN lens. The end facets of the pair of optical fibers, the first, second and third birefringent crystals, the GRIN lens, the Faraday rotator, and the mirror element are arranged and oriented with respect to each other so that light in one direction from a first optical fiber of the pair passes through, and back from, the first, second and third birefringent crystals, the GRIN lens, the Faraday rotator and the mirror element into a second optical fiber of the pair. On the other hand, light in a reverse direction from the second optical fiber passes through, and back from, the first, second and third birefringent crystals, the GRIN lens, the Faraday rotator and the mirror element, but not into the first optical fiber so that an optical isolation function is achieved.

Multiple optical isolators may be obtained with multiple pairs of optical fibers fixed in the channel of the ferrule. The end facets of the pairs of optical fibers, the first, second and third birefringent crystals, the GRIN lens, the Faraday rotator, and the mirror element are arranged and oriented with respect to each other so that light in one direction from a first optical fiber of each pair passes through, and back from, the first, second and third birefringent crystals, the GRIN lens, the Faraday rotator and the mirror element into a second optical fiber of the pair. On the other hand, light in a reverse direction from the second optical fiber of each pair passes through, and back from, the first, second and third birefringent crystals, the GRIN lens, the Faraday rotator and the mirror element, but not into the corresponding first optical fiber of the pair so that an optical isolation function is achieved with each pair of optical fibers.

BRIEF DESCRIPTION OF THE DRAWINGS

FIGS. 6A–6D illustrate different configurations of the ferrule holding the input and output optical fibers of the optical isolator of FIG. 1;

FIG. 7 illustrates a joined optical fiber subasssembly which may be used in the FIG. 1 optical isolator;

FIG. 8 illustrates the end facet of the input optical fiber of the optical isolator of FIG. 1;

FIG. 9 is a cross-sectional view of the optical isolator of FIG. I in a package;

DESCRIPTION OF THE SPECIFIC EMBODIMENTS

Figure 1:
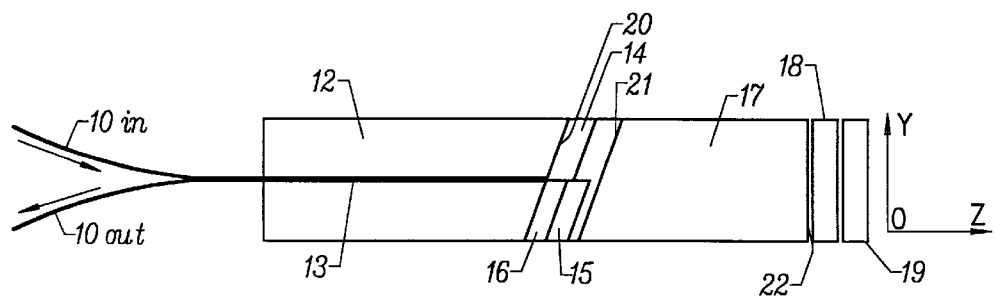
FIG. 1 is a representational cross-sectional sideview of a folded reflection optical isolator, according to one embodiment of the present invention.

FIG. 1 illustrates the arrangement of the elements of a folded reflection optical isolator, according to one embodiment of the present invention. The isolator has an input fiber $10_{in}$ and an output fiber $10_{out}$. Typically, these optical fibers are single mode optical fibers. The ends of the fibers are held in a central longitudinal channel 13 of a glass ferrule 12 The end facets of the two fibers $10_{in}$ and $10_{out}$ are co-planar with a end face 20 of the ferrule 12. The end face 20 (and the end facets of the fibers $10_{in}$ and $10_{out}$) is slightly slanted with respect to the longitudinal axis of the ferrule 12. A first birefringent crystal 14 is fixed over the end facet of the input fiber $10_{in}$. A second 10 birefringent crystal 15 and third birefringent crystal 16 are fixed in a stack over the end facet of the output fiber $10_{out}$. More details of this arrangement are described below.

Facing the birefringent crystals 14–16 and the end face 20 of the ferrule 12 is a reciprocally slanted end face 21 of a near quarter-pitch GRIN (Graded INdex) lens 17. The end facets of the input and output fibers $10_{in}$ and $10_{out}$ are equally displaced from the longitudinal (and optical) axis of the GRIN lens 17. At an opposite end face 22 of the GRIN lens 17 is placed a 22.5° Faraday rotator 18. Following the rotator 18 is a mirror element 19, which is highly reflective. The element 19 may be a dielectric multilayer mirror, or a metallic mirror, formed as a separate element or simply coated on the far surface of the Faraday rotator 18.

The optical isolator operates in general terms as follows: In the forward direction, light entering through the input fiber $10_{in}$ is separated into two linearly polarized component beams by the first birefringent crystal 14. After passing through the GRIN lens 17 and Faraday rotator 18 twice by reflection off the mirror element 19, there is a rotation imparted to the polarized components. The second and third birefringent crystals 15 and 16 combine the polarized component beams into one beam at the end facet of the output fiber $10_{out}$. In the reverse direction, light entering through the output fiber $10_{out}$ is also separated into two linearly polarized component beams by the second and third birefringent crystals 15 and 16. By reflection off the mirror element 19, the component beams also pass through the GRIN lens 17 and Faraday rotator 18 twice. The Faraday rotator 18 also rotates the polarized component beams, but its action is nonreciprocal. The direction of rotation remains in the same direction as in the case of the light traveling in the forward direction from the input fiber $10_{in}$. The unchanged direction of rotation ensures that the first birefringent crystal 14 does not combine the two polarized component beams into one, and the beams do not arrive at the end facet of the input fiber $10_{in}$. Light from the output fiber cannot enter the input fiber. Light in this reverse direction is effectively blocked.

Since the input and output fibers are located next to each other by a reflector, the mirror element 19, and the operation of the GRIN lens 17, the optical isolator has the two fibers folded together to help miniaturize the assembled device.

Figure 2A:
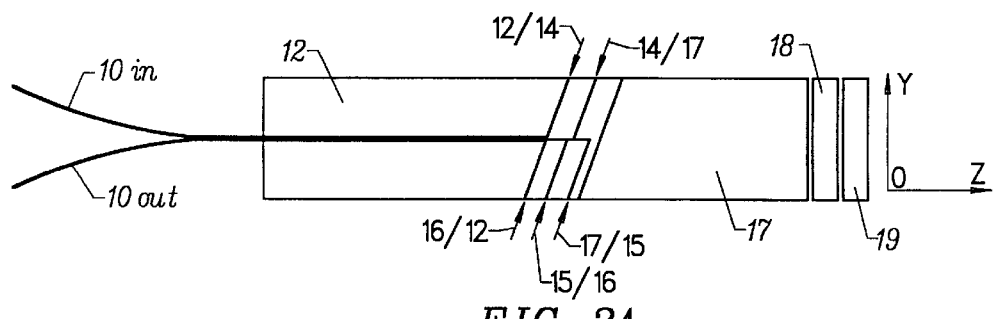
FIG. 2A is a cross-sectional sideview of the FIG. 1 optical isolator with locations between elements indicated.
Figure 2B:
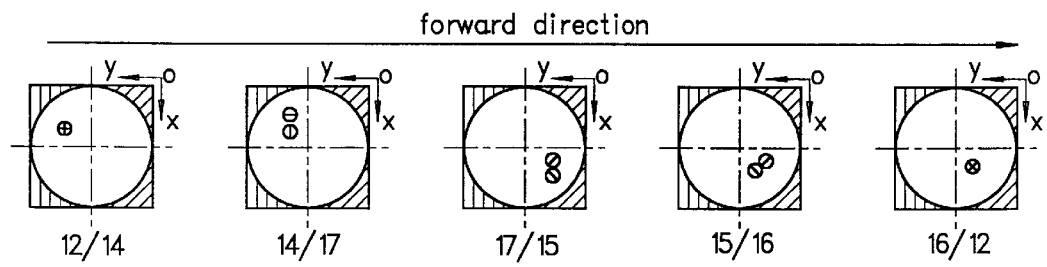
FIG. 2B is a representation of the state of the light traveling in the forward direction through the optical isolator at the locations indicated in FIG. 2A.
Figure 2C:
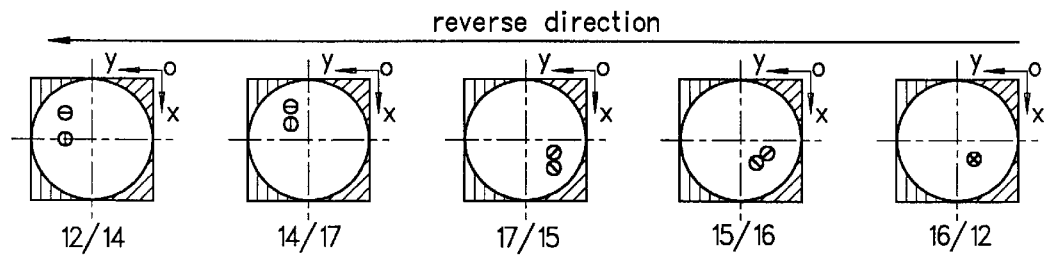
FIG. 2C is a representation of the state of the light traveling in the reverse direction through the optical isolator at the locations indicated in FIG. 2A.

FIGS. 2A, 2B and 2C detail the operation of optical isolator of FIG. 1 and its various elements. In the cross-sectional sideview of FIG. 2A, a location between elements is indicated by the notation, i/j, i.e., the location between the element having reference numeral i and the element having reference numeral j. FIG. 2B represents of the state of the light traveling in the forward direction through the optical isolator at the locations indicated in FIG. 2A; FIG. 2C represents the state of the light traveling in the reverse direction.

Figure 10:
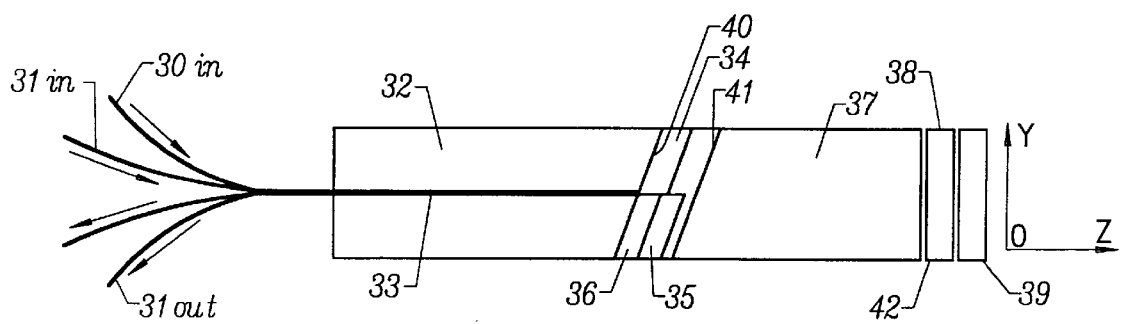
FIG. 10 is a representational cross-sectional sideview of a double folded reflector optical isolator, according to one embodiment of the present invention.

In the forward direction, as represented by FIG. 2B, the light at the end facet of input fiber $10_{in}$ is shown at the location 12/14. Note that the input light is displaced from the longitudinal axis of the GRIN lens 17. The first birefringent crystal 14 separates the light into its two linear polarization components, the o-ray and the e-ray. Location 14/17 illustrates this separation according to the state of polarization of the light. The light then is collimated by the GRIN lens 17 and the polarization of each component is rotated 22.5° by the Faraday rotator 18. The light is then sent back through the Faraday rotator 18 again by the mirror element 19. The Faraday rotator 18 again rotates the polarization of each beam by 22.5° so that the total rotation of the polarization in each component is 45° in a positive, counter-clockwise direction, with reference to the direction of light travel. Due to the action of the GRIN lens 17, the two polarized component beams exchange their relative positions vertically and horizontally. Their positions are symmetrical to their original positions around the GRIN lens optical axis. FIG. 10 illustrates this action by the GRIN lens 17 and the mirror element 19. The light is now ready to enter the second birefringent crystal 15, as represented by the location 17/15. The second birefringent crystal 15 moves the location of one of the polarization component beams, as shown at the location 15/16, and the third birefringent crystal 16 moves the other so that both polarized component beams are combined into one, as illustrated by the location 16/12. The combined beam is aligned with the end facet of the output fiber $10_{out}$, so that the light path through the optical isolator in this direction is complete. Light enters the input fiber $10_{in}$ and leaves through the output fiber $10_{out}$.

Such is not the case for light traveling in the reverse direction. Light entering the output fiber $10_{out}$ and leaving its end facet is shown by location 16/12 of FIG. 2C. The light is split into two different polarized beams by the third birefringent crystal 16, as shown by location 15/16. The second birefringent crystal 15 moves the location of one of the component beams as shown by location 17/15. The light beams are then collimated by the GRIN lens 17, rotated 22.5° once by the Faraday rotator 18, reflected by the mirror element 19, rotated once again 22.5° by the Faraday rotator 17, and refocused by the GRIN lens 17. The result is shown by location 14/17 in FIG. 2C. However, due to the nature of the Faraday rotator 18, the polarization of each component beam is rotated 45° in a positive, counter-clockwise direction, with reference to the direction of light travel. The polarization of the component beams entering the first birefringent crystal 14 at location 14/17 in the reverse direction is rotated 90° from the polarization of the component beams leaving the first birefringent crystal 14 at location 14/17 in the forward direction. This can be seen by comparing the locations 14/17 of FIGS. 2B and 2C. In effect, the polarized component beams have switched places and the first birefringent crystal 14 cannot combine the two polarized beams into one beam at the end facet of the input fiber $10_{in}$. Light in the reverse direction, i.e., light entering the output fiber $10_{out}$, does not enter the input fiber $10_{in}$, i.e., light in the reverse direction is effectively blocked.

The birefringent crystals 14–16, all rectangular solids, must be arranged and oriented to effect the operation described above. If all three crystals are formed from the same birefringent crystal material, the thickness of the second birefringent crystal 15 should be equal to the thickness of the third birefringent crystal 16 and is √2/2 times the thickness of the first birefringent crystal 14. The principal plane of the second birefringent crystal 15 is perpendicular to the principal plane of the third birefringent crystal 16 and forms a 45° angle with the principal plane of the first birefringent crystal 14. The birefringent crystals 14–16 can be formed from any number of birefringent crystals, such as calcite, rutile, YVO$_4$, lithium niobate and so on. Some properties of these materials are shown in the table below:

Table of Birefringent Crystals

| Material | $n_e$ | $n_O$ | Maximum Separation Angle |
|---|---|---|---|
| Calcite | 1.4777 | 1.6343 | 5.733° |
| Rutile | 2.709 | 2.453 | 5.651° |
| YVO$_4$ | 2.1486 | 1.9447 | 5.675° |
| Lithium Niobate | 2.208 | 2.300 | 2.336° |

Figure 3A:
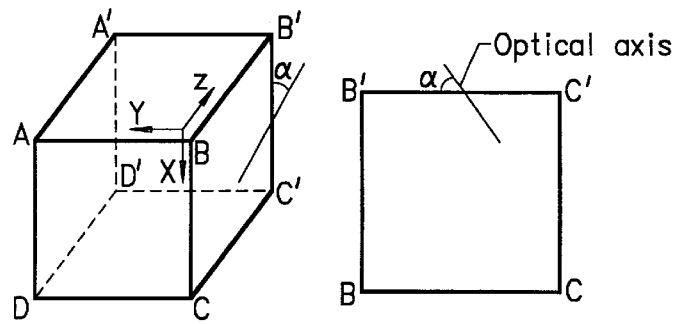
FIG. 3A illustrates the orientation of the first birefringent crystal in the optical isolator of FIG. 1.
Figure 3B:
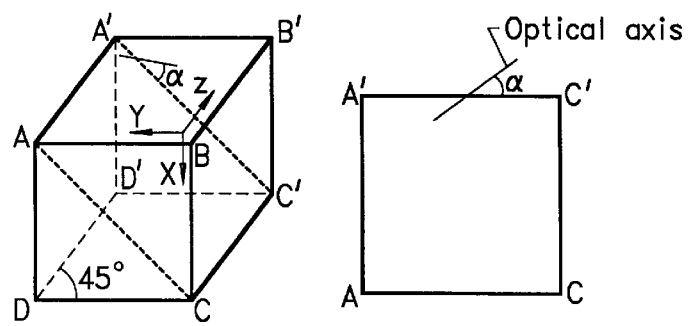
FIG. 3B illustrates the orientation of the second birefringent crystal in the optical isolator of FIG. 1.
Figure 3C:
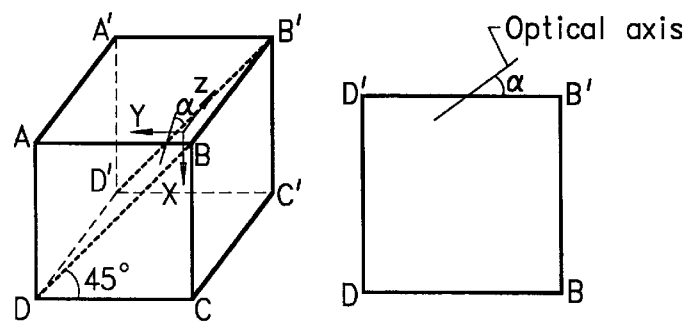
FIG. 3C illustrates the orientation of the third birefringent crystal in the optical isolator of FIG. 1.

For one embodiment of the present invention, FIGS. 3A, 3B and 3C illustrate the arrangement of the three birefringent crystals 14–16 if all are formed from YVO$_4$. As shown in FIG. 3A, the first birefringent crystal 14 has its optical axis plane in the vertical (the YOZ) plane and its optical axis oriented at α=45°. Dimensionally, ABCD=A'B'C'D'=1 mm×1 mm, and AA'=BB'=CC'=DD'=0.300 mm. The second birefringent crystal 15 has its optical axis plane arranged 45° to the horizontal (the XOZ plane) and its optical axis oriented α=45°. Its dimensions are ABCD=A'B'C'D' =1 mm×1 mm and AA'=BB'=CC'DD'=0.212 mm. Finally, the third birefringent crystal 16 has its optical axis plane set at 45° to the horizontal and its optical axis oriented at α=45°. ABCD=ABCD=1mm×1 mm, and AA'=BB'=CC'=DD'= 0.212 mm. In fact, the third birefringent crystal 16 is the same as the second birefringent crystal 15, except that the rotational orientations of the two crystals are different.

Of course, by appropriately adjusting the parameters of the first, second and third birefringent crystals 14–16, the optical isolation can be reversed. That is, the forward, or transmitting, direction is from the second optical fiber 10$_{out}$ to the first optical fiber 10$_{in}$. The reverse, or blocking direction, is from the first optical fiber 10$_{in}$ to the second optical fiber 10$_{out}$.

In the design of the optical isolator, a consideration in the selection of the birefringent materials is the separation between the end facets of the input and output fibers 10$_{in}$ and 10$_{out}$ in the channel 13. If the separation between the optical fibers and end facets is large, then birefringent crystals having a smaller separation angle, such as lithium niobate (see the table above) may be used. The light beams must be adequately separated after passing through a birefringent crystal to ensure high isolation performance for the optical isolator. For materials having a lesser separation ability, a thicker crystal must be used. The thicker crystal results in a larger beam diameter and the two end facets must be accordingly separated so that the edge of the first birefringent crystal 14 is sufficiently removed from the center of end facet of the input fiber to encompass the larger beam; likewise, the second and third birefringent crystals 15 and 16 must have sufficient room to adequately cover the end facet of the output fiber.

Figure 4:
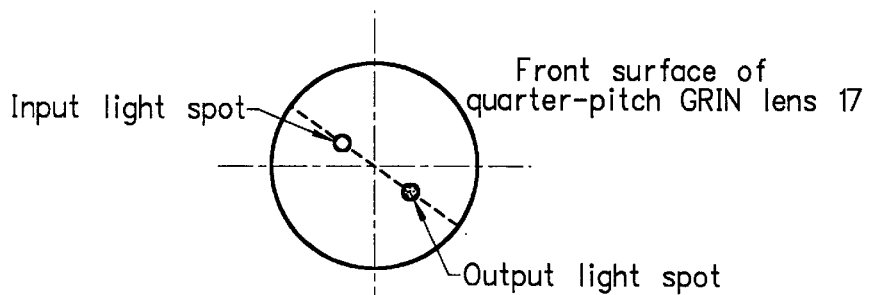
FIG. 4 is an end view of the GRIN lens of the FIG. 1 optical isolator.

Due to the distance between the end facets of the fibers 10$_{in}$ and 10$_{out}$ and the GRIN lens 17, the GRIN lens 17 is actually somewhat shorter than a quarter pitch. The GRIN lens 17 is in the range of 0.18 to 0.24 pitch to ensure that the light is collimated after it passes through the GRIN lens 17 the first time. The GRIN lens 17 and the mirror element 19 are arranged so that the normal of the mirror element is parallel to the optical axis of the GRIN lens 17. The GRIN lens has a symmetrical mapping characteristic around its optical axis as shown in FIG. 4. Even with the Faraday rotator 18 inserted between the GRIN lens 17 and the mirror element 19, the mapping remains unchanged, though the polarization states of the light are transformed by the Faraday rotator 18.

Figure 5A:
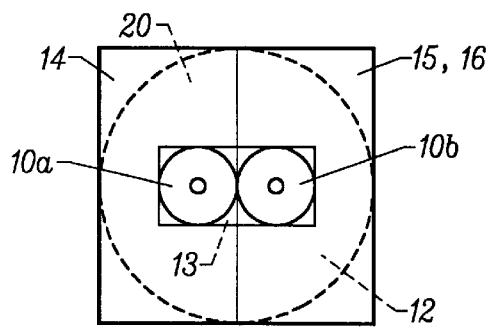
FIG. 5A is a cross-sectional end view illustrating the arrangement of the end facets of the input and output fibers with the first, second and third birefringent crystals of the optical isolator of FIG. 1.
Figure 5B:
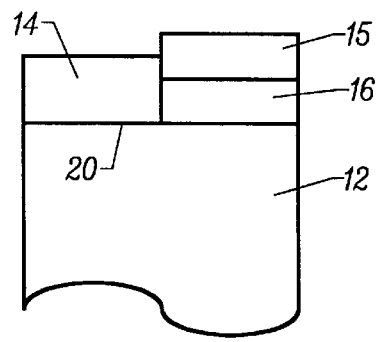
FIG. 5B is a side view of the arrangement of FIG. 5A.

FIG. 5A is an end cross-sectional view of the birefringent crystals 14–16 over the end facets of the input fiber 10$_{in}$ and the output fiber 10$_{out}$, which are in the center longitudinal channel 13 of the ferrule 12. The first birefringent crystal 14 covers the end facet the input fiber 10$_{in}$ and the second and third birefringent crystals 15, 16 cover the end facet of the output fiber 10$_{out}$. The relationship of the two birefringent crystals 15, 16 is better shown in the side view of FIG. 5B, which shows the end face 20 of the ferrule 12 without a slant. The birefringent crystals 14–16 are epoxied over the end face 20 of the ferrule 12. An optically transparent epoxy, such as Norland 62 from Norland Products, Inc. of New Brunswick, N.J. or 353ND from Epoxy Technology Inc, of Billerica, Mass., has been found suitable for this purpose. The end face 20 of the ferrule 12 is angle-polished in a plane having a line connecting the centers of the two end facets of the fibers 10$_{in}$ and 10$_{out}$. The angle is about 8–12° from the plane perpendicular to the longitudinal axis of the ferrule 12. Thus it should be understood that the slant of the end face 20 in FIG. 1 (and FIG. 2A) is 90° off with respect to the placement of the birefringent crystals 14–16.

Figure 6A:
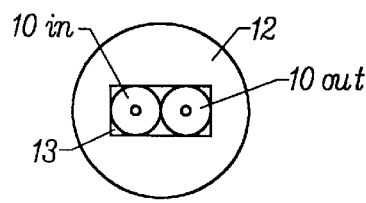
Figure 6B:
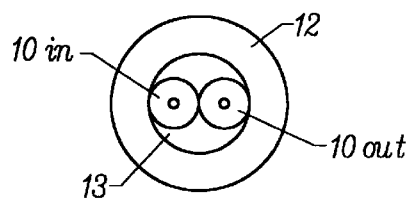

The central channel 13 of the ferrule 12 can be shaped in a number of different ways to hold the input fiber 10$_{in}$ and output fiber 10$_{out}$. Besides the rectangular cross-section of FIG. 6A, the channel 13 may have a circular cross-section to hold the fibers 10$_{in}$ and 10$_{out}$, as illustrated in FIG. 6B. In FIG. 6C the channel 13 is separated into two parts, with each part having a circular cross-section and dimensioned to snugly hold one of the fibers 10$_{in}$ and 10$_{out}$. In FIG. 6D, the separated channels 13 are square in cross-section.

Rather than two completely separated optical fibers, an optical fiber end section having the two optical fibers 10$_{in}$ and 10$_{out}$ joining into a single cladding which encloses two cores 70 may be inserted into the channel 13 of the ferrule. FIG. 7 is an enlarged illustration of this end section which separates into the two optical fibers 10$_{in}$ and 10$_{out}$, each with its own core and cladding, away from the ferrule 12. Besides the ease in manufacturing in securing only one optical fiber, i.e., a single cladding with two cores 70, into the ferrule channel 13, performance is enhanced. Rather than the relatively small diameter of a single mode optical fiber, e.g., 8.3 μm for an SMF-28 fiber, the cores in the channel 13 have expanded diameters. Note the expanded diameters of the cores in the section 70 in comparison with the cores of the optical fibers 10$_{in}$ and 10$_{out}$. The larger diameters increase alignment tolerances and reduce insertion loss in the forward direction. More details of this end section having two cores are described in U.S. Appln. No. 09/275,354, entitled "THERMALLY EXPANDED MULTIPLE CORE FIBER," and filed Mar. 23, 1999 by Yong Huang; and U.S. Appln. 09/244285, entitled "FIBEROPTIC DEVICES WITH A JOINED OPTICAL FIBER SUBASSEMBLY" (Attorney Docket No. 013011-008000), filed of even date by J. J. Pan et al. Both applications are assigned to the present assignee and are hereby incorporated by reference.

To further improve the performance of the optical isolator, the end facet of the input optical fiber 10$_{in}$ should have its core clear, but the cladding coated with an optically opaque coating, such as gold. Such an end facet is illustrated by FIG. 8. The opaque coating over the cladding blocks light in the reverse direction which is incident upon the cladding of the input fiber from undesirably leaking into the core. A description of this fiber end facet and its manufacturing process may be found in U.S. Pat. No. 5,546,186, entitled "OPTICAL FIBER END FOR APPLICATION IN AN OPTICAL ISOLATOR AND A METHOD OF MANUFACTURE THEREOF," which issued on Aug. 13, 1996 to M. Shih et al. and is assigned to the present assignee, and which is hereby incorporated for all purposes.

FIG. 9 illustrated the optical isolator of FIG. 1 in a package. The package includes a molded plastic tube 26 fixed to an end cap 27. The tube 26 protects the portions of the input and output optical fibers $10_{in}$ and $10_{out}$ entering the ferrule 12. The end cap 27 fits over the ferrule, while a second end cap 29 fits over the opposite end of the optical isolator, i.e., the mirror element 19, the Faraday rotator 18 and part of the GRIN lens 17. A center portion 28, which engages the two end caps 26 and 29, completes the package for the optical isolator. The end caps and center 27–29 of the package are formed from stainless steel. The dimensions of the package is 18 mm long with a circular diameter of 4 mm, not including the plastic tube. Thus the packaged optical isolator is miniaturized compared to present optical isolators.

Besides its miniature size, the optical isolator of the present invention has relatively low manufacturing costs with ease of assembly. Both the input and output optical fibers are fixed in the same ferrule. Optical performance is high. The optical isolator has good isolation performance, a wide spectral bandwidth, very low polarization mode dispersion (PMD) and polarization dependent loss (PDL), and is polarization insensitive. The optical isolator has better temperature stability compared to other isolators because a Faraday rotator for 22.5° is used, rather than a Faraday rotator for 45°. Such stability is very suitable for wavelengths in the range of 0.9 to 1.2 $\mu$m, common output wavelengths for pumping lasers found in optical networks.

The present invention also offers the advantage of a plurality of optical isolators in a single assembly. FIG. 10 illustrates a double optical isolator, i.e., an optical isolator which can operate on two optical fibers at once. The isolator has two input fibers $30_{in}$ and $31_{in}$, and two output fibers $30_{out}$ and $31_{out}$. The ends of these four optical fibers are held in a central longitudinal channel 33 in a glass ferrule 32. The end facets of the four fibers $30_{in}$, $31_{in}$, $30_{out}$ and $31_{out}$ are co-planar with a slanted end face 40 of the ferrule 32. Also attached to the end face 40 is a first birefringent crystal 34, a second birefringent crystal 35 and a third birefringent crystal 36. Facing the crystals 34–36 and end face 40 of the ferrule 32 is a reciprocally slanted end face 41 of a quarter-pitch GRIN lens 37. As shown below, the first birefringent crystal 34 is arranged over the end facets of the input fibers $30_{in}$, $31_{in}$, and the second and third birefringent crystals 35 and 36 are arranged over the end facets of the output fibers $30_{out}$, $31_{out}$. Over an opposite end face 42 of the GRIN lens 17 is placed a 22.5° Faraday rotator 38. Following the rotator 38 is a highly reflecting mirror element 19, which may be a dielectric multilayer mirror, or a metallic mirror, formed as a separate element or simply coated on the of the Faraday rotator 38.

Figure 11:
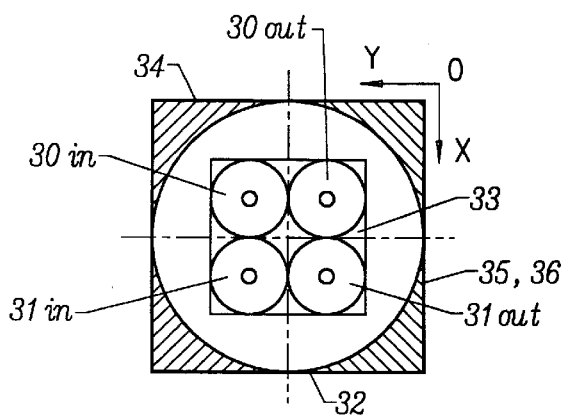
FIG. 11 is a cross-sectional end view illustrating the arrangement of the end facets of the two input fibers and two output fibers with the first, second and third birefringent crystals of the FIG. 10 optical isolator.
Figure 12:
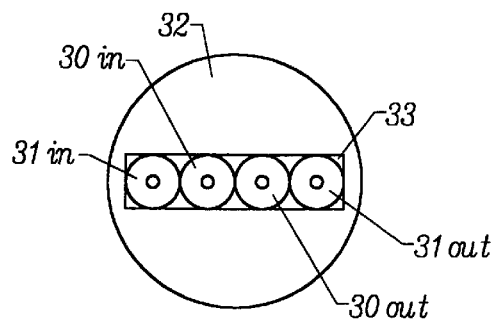
FIG. 12 illustrates another configuration of the ferrule holding the two input fibers and two output fibers of the FIG. 10 optical isolator.

The end cross-sectional view of the ferrule 32 of FIG. 11 shows the arrangement the four optical fibers $30_{in}$, $31_{in}$, $30_{out}$ and $31_{out}$ in the channel 33. The channel 33 has a square cross-section. The first birefringent crystal 34 covers the end facets of the input fibers $30_{in}$, $31_{in}$, while the second and third birefringent crystals 35, 36 cover the end facets of the output fibers $30_{out}$, $31_{out}$. FIG. 12 is an end cross-section view of another arrangement of the two input optical fibers $30_{in}$, $31_{in}$ and the two output fibers $30_{out}$, $31_{out}$. In this case the channel 33 has a rectangular cross-section so that the end facets of the four optical fibers $30_{in}$, $31_{in}$, $30_{out}$, and $31_{out}$ are linearly aligned. In any case, it is understood that the forward direction of one optical isolator is from the input fiber $30_{in}$ to the output fiber $30_{out}$; the forward direction of the second optical isolator is from the input fiber $31_{in}$ to the output fiber $31_{out}$.

Figure 13:
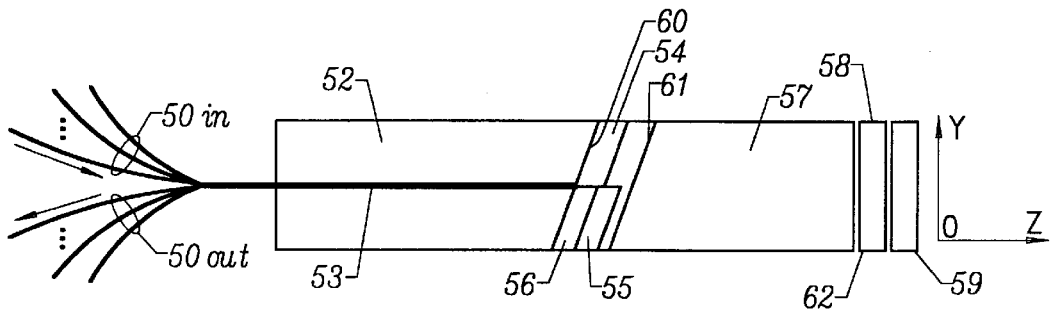
FIG. 13 is a representational cross sectional sideview of a multiple folded reflector optical isolator, according to another embodiment of the present invention.

A further generalization of folded reflection optical isolator according to the present invention is shown in FIG. 13. In this optical isolator there are n input optical fibers and n corresponding output fibers. Similar to the previously described optical isolators of the present invention, the optical isolator has n input fibers $50_{in}$ and n output fibers $50_{out}$. The ends of these 2n optical fibers are held in a central longitudinal channel 53 in a glass ferrule 52 with the end facets of the 2n optical fibers $50_{in}$ and $50_{out}$ co-planar with a slanted end face 60 of the ferrule 52. Also attached to the end face 60 is a first birefringent crystal 54, a second birefringent crystal 55 and a third birefringent crystal 56. Facing the birefringent crystals 54–56 and the end face 60 of the ferrule 52 is a reciprocally slanted end face 61 of a quarter-pitch GRIN lens 57. As shown in FIG. 13 (and more clearly in FIG. 14), the first birefringent crystal 54 is arranged over the end facets of the input fibers $50_{in}$ and the second and third crystals 55 and 56 are arranged over the end facets of the output fibers $50_{out}$. Over an opposite end face 62 of the GRIN lens 57 is placed a 22.5° Faraday rotator 58. Following the rotator 58 is a highly reflecting mirror element 59.

Figure 14:
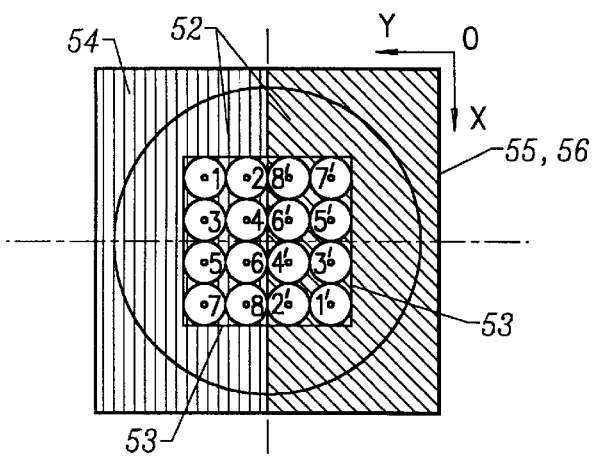
FIG. 14 illustrates the arrangement of the end facets of the multiple input fibers and multiple output fibers with the first, second and third birefringent crystals of the FIG. 13 optical isolator.

FIG. 14 illustrates an arrangement for 8 input optical fibers and 8 output optical fibers for the generalized multiple optical isolator of FIG. 15. The channel 53 has a square cross-section and the 8 input fibers $50_{in}$; the 8 output fibers $50_{out}$ occupy the remaining half of the channel 53. As before, the first birefringent crystal 54 covers the end facets of the input fibers $50_{in}$ and the second and third birefringent crystals 55, 56 cover the output fibers $50_{out}$. It should be noted that the input fibers are labeled from 1–8. Likewise the output fibers are labeled from 1–8 to indicate the correspondence between pairs of input and output fibers. Hence there are eight optical isolators with input/output fibers 1/1, 2/2, 3/3 and so forth.

While the description above provides a full and complete disclosure of the preferred embodiments of the present invention, various modifications, alternate constructions, and equivalents will be obvious to those with skill in the art. Thus, the scope of the present invention is limited solely by the metes and bounds of the appended claims.

What is claimed is:

1. An optical isolator comprising
   a sleeve having a longitudinal channel;
   a first pair of optical fibers in said longitudinal channel, each of said first pair of optical fibers having an end facet;
   a first birefringent crystal over an end facet of one of said pair of said optical fibers;
   second and third birefringent crystals over an end facet of the other of said pair of said optical fibers;
   a GRIN lens having a first end face proximate said first, second and third birefringent crystals and having a second end face;
   a mirror element; and
   a Faraday rotator between said mirror element and said second end face of said GRIN lens, said end facets of said pair of optical fibers, said first, second and third birefringent crystals, said GRIN lens, said Faraday rotator, and said mirror element arranged and oriented with respect to each other so that light in one direction from a first optical fiber of said pair passes through, and back from, said first, second and third birefringent crystals, said GRIN lens, said Faraday rotator and said mirror element into a second optical fiber of said pair, and light in a reverse direction from said second optical fiber passes through, and back from, said first, second and third birefringent crystals, said GRIN lens, said Faraday rotator and said mirror element, but not into said first optical fiber.

2. The optical isolator of claim 1 further comprising a second pair of optical fibers in said longitudinal channel, each of said second pair of optical fibers having an end facet;

said first birefringent crystal over an end facet of one optical fiber of said second pair;

second and third birefringent crystals over an end facet of the other optical fiber of said second pair;

and wherein said end facets of said second pair of optical fibers, said first, second and third birefringent crystals, said GRIN lens, said Faraday rotator, and said reflecting element arranged and oriented with respect to each other so that light in one direction from a first optical fiber of said second pair passes through, and back from, said first, second and third birefringent crystals, said GRIN lens, said Faraday rotator and said mirror element into a second optical fiber of said second pair, but light in a reverse direction from said second optical fiber of said second pair passes through, and back from, said first, second and third birefringent crystals, said GRIN lens, said Faraday rotator and said mirror element, but not into said first optical fiber of said second pair.

3. The optical isolator of claim 2 wherein said end facets of said first and second pairs of said optical fibers are linearly arranged in a cross-sectional end view of said channel.

4. The optical isolator of claim 2 wherein said end facets of said first and second pairs of said optical fibers are arranged in a rectangle in a cross-sectional end view of said channel.

5. The optical isolator of claim 1 further comprising n pairs of optical fibers in said longitudinal channel, n being greater than two, each optical fiber of said n pairs having an end facet;

said first birefringent crystal over an end facet of one optical fiber of each one of said n pairs;

second and third birefringent crystals over an end facet of the other optical fiber of each one of said n pair; and wherein said end facets of said n pairs of optical fibers, said first, second and third birefringent crystals, said GRIN lens, said Faraday rotator, and said mirror element arranged and oriented with respect to each other so that light in one direction from a first optical fiber of one of said n pairs passes through, and back from, said first, second and third birefringent crystals, said GRIN lens, said Faraday rotator and said mirror element into a second optical fiber of said one pair, but light in a reverse direction from said second optical fiber of said one pair passes through, and back from, said first, second and third birefringent crystals, said GRIN lens, said Faraday rotator and said mirror element, but not into said first optical fiber of said pair.

6. The optical isolator of claim 5 wherein said end facets of n pairs of said optical fibers are arranged in a rectangle in a cross-sectional end view of said channel.

7. The optical isolator of claim 1 wherein at least one of said first, second and third birefringent crystals comprise $YVO_4$.

8. The optical isolator of claim 7 wherein said first, second and third birefringent crystals comprise $YVO_4$.

9. The optical isolator of claim 1 wherein at least one of said first, second and third birefringent crystals comprise calcite.

10. The optical isolator of claim 9 wherein said first, second and third birefringent crystals comprise calcite.

11. The optical isolator of claim 1 wherein at least one of said first, second and third birefringent crystals comprise rutile.

12. The optical isolator of claim 11 wherein said first, second and third birefringent crystals comprise rutile.

13. The optical isolator of claim 1 wherein at least one of said first, second and third birefringent crystals comprise lithium niobate.

14. The optical isolator of claim 13 wherein said first, second and third birefringent crystals comprise lithium niobate.

* * * * *